United States Patent
Kwon et al.

(10) Patent No.: US 8,474,844 B2
(45) Date of Patent: Jul. 2, 2013

(54) SUSPENSION STRUCTURE FOR MULTI-PURPOSE UTILITY VEHICLE

(75) Inventors: Byoung Soo Kwon, Changnyeong-gun (KR); Jin Ho Hwang, Changnyeong-gun (KR)

(73) Assignee: Daedong Industrial Co., Ltd., Daegu (KR)

( * ) Notice: Subject to any disclaimer, the term of this patent is extended or adjusted under 35 U.S.C. 154(b) by 0 days.

(21) Appl. No.: 13/592,135

(22) Filed: Aug. 22, 2012

(65) Prior Publication Data

US 2013/0049318 A1 Feb. 28, 2013

(30) Foreign Application Priority Data

Aug. 25, 2011 (KR) .................. 10-2011-0084869

(51) Int. Cl.
*B60G 3/18* (2006.01)
(52) U.S. Cl.
USPC ....... 280/124.135; 280/124.136; 280/124.139
(58) Field of Classification Search
USPC ................ 280/124.135, 124.136, 124.139, 280/124.109
See application file for complete search history.

(56) References Cited

U.S. PATENT DOCUMENTS

| 5,496,055 | A | * | 3/1996 | Shibahata et al. | 280/124.141 |
| 6,116,626 | A | * | 9/2000 | Cherry et al. | 280/124.135 |
| 7,591,472 | B2 | * | 9/2009 | Kinjyo et al. | 280/124.152 |
| 7,690,661 | B2 | * | 4/2010 | Tsuruta et al. | 280/124.135 |
| 7,770,907 | B2 | * | 8/2010 | Shimizu et al. | 280/124.134 |
| 2003/0006573 | A1 | * | 1/2003 | Seki | 280/124.135 |

FOREIGN PATENT DOCUMENTS

| JP | 05-016630 A | 1/1993 |
| KR | 2000-0013586 U | 7/2000 |

OTHER PUBLICATIONS

KIPO Office Action for Korean Patent Application No. 10-2011-0084869 which corresponds to the above-identified U.S. application.

* cited by examiner

*Primary Examiner* — Toan To
(74) *Attorney, Agent, or Firm* — LRK Patent Law Firm

(57) ABSTRACT

A suspension structure is a double wishbone type suspension including a spring damper and is characterized in that, among a plurality of mounting points where an upper arm and a lower arm arranged vertically parallel to each other are connected to a vehicle body, the vertical positions of the mounting points, which are located on the left or right side with respect to a hub assembly, of the upper arm and the lower arm are different from each other.

7 Claims, 8 Drawing Sheets

SUSPENSION STRUCTURE FOR MULTI-PURPOSE UTILITY VEHICLE

CROSS-REFERENCE TO RELATED PATENT APPLICATION

This application claims the benefit of Korean Patent Application No. 10-2011-0084869, filed on Aug. 25, 2011, in the Korean Intellectual Property Office, the disclosure of which is incorporated herein in its entirety by reference.

BACKGROUND OF THE INVENTION

1. Field of the Invention

The present invention relates to a suspension structure for a multi-purpose utility vehicle and, more particularly, to a double wishbone type suspension structure for a multi-purpose utility vehicle, which can more effectively absorb impact applied from a road surface.

2. Description of the Related Art

A mechanism for a vehicle which absorbs impact from a road surface so as not be transmitted to a vehicle body or passenger refers to a suspension system. There are various types of suspensions, and among them, a double wishbone type suspension is an independent suspension system and comprises two wishbone-shaped arms.

In detail, the double wishbone type suspension has a structure in which two upper and lower arms, which are mounted substantially horizontally to the road surface, support an upright (i.e., an assembly including an axle or hub) interposed therebetween. The advantages of the double wishbone type suspension are that it is structurally easy to ensure rigidity, the change in camber can be minimized when the suspension bumps, and the change in frictional force (i.e., grip force) between tires and road surface is reduced.

Moreover, the geometric configuration of the double wishbone type suspension can be relatively freely and easily changed by changing the length of a rod or the installation angle of the arms. Thus, the steering characteristics of the double wishbone type suspension can be readily changed. Accordingly, vehicles that often travel on rough roads are generally provided with the double wishbone type suspension.

A compact multi-purpose utility vehicle, which is mainly used as a short-distance carrying vehicle in an agricultural field or construction site, often travels on rough roads due to the nature of works. Accordingly, the double wishbone type suspension is generally employed in the multi-purpose utility vehicle. However, the vehicle body of the multi-purpose utility vehicle, which is mainly used as a short-distance carrying vehicle, is small, and thus it is difficult to change the geometric configuration of the suspension due to the nature of its structure.

That is, in order to change the suspension structure, it is necessary to change a vehicle frame structure to fit the suspension structure. However, it is difficult to change the vehicle frame structure of the multi-purpose utility vehicle having a small vehicle body, and thus it is difficult to change the suspension structure. As a result, in the case of the compact multi-purpose utility vehicle, which is mainly used as a short-distance carrying vehicle, it is difficult to change the geometric configuration such as the installation angle of the arms, etc., and thus it is difficult to arbitrarily change the steering characteristics, etc.

SUMMARY OF THE INVENTION

The present invention has been made in an effort to solve the above-described problems associated with prior art, and an object of the present invention is to provide a suspension structure for a multi-purpose utility vehicle, in which the installation positions of arms, which constitute a double wishbone suspension, can be changed in various manners without significantly changing a vehicle frame structure, thus controlling steering characteristics according to driving conditions of the vehicle.

According to an aspect of the present invention to achieve the above object of the present invention, there is provided a suspension structure for a multi-purpose utility vehicle, the suspension structure comprising a double wishbone type suspension comprising a spring damper, characterized in that, among a plurality of mounting points where an upper arm and a lower arm arranged vertically parallel to each other are connected to a vehicle body, vertical positions of the mounting points, which are located on the left or right side with respect to a hub assembly rotatably supporting an axle, of the upper arm and the lower arm are different from each other.

In the present embodiment, the upper arm and the lower arm may comprise a pair of left and right hinge connecting ends, respectively, for forming the mounting points, the hub assembly may be vertically movably disposed in a position spaced apart from a vehicle frame with the upper arm and the lower arm interposed therebetween, two main mounting members for mounting the upper arm and the lower arm may be installed parallel to each other at regular intervals in the longitudinal direction on the vehicle frame, a sub-mounting member may be installed on one side of any one of the two main mounting members, and among the pairs of hinge connecting ends of the upper arm and the lower, the hinge connecting end, which is located on the left or right side with respect to the hub assembly, of any one of the upper arm and the lower arm may be hinge-connected to the sub-mounting member to form the mounting point such that the vertical positions of the mounting points on one side of the upper arm and the lower arm can be different from each other.

In this case, the sub-mounting member may be installed at a lower end of the main mounting member, which is located on the right side with respect to the hub assembly (i.e., at the rear with respect to the longitudinal direction of the vehicle), of the two main mounting members, and the hinge connecting end on the right side of the lower arm may be hinge-connected to the sub-mounting member such that the right mounting point of the lower arm can be formed in a vertical position which is different from that of the right mounting point of the upper arm.

The sub-mounting member may be installed toward the main mounting member, which is located on the left side (i.e., at the front with respect to the longitudinal direction of the vehicle), where the sub-mounting member is not installed such that the mounting point on the right side of the lower arm, whose vertical position is different from that of the mounting point of the upper arm, can be formed between the two main mounting members.

As another example, the sub-mounting member may be installed at a lower end of the main mounting member, which is located on the left side with respect to the hub assembly (i.e., at the front with respect to the longitudinal direction of the vehicle), of the two main mounting members, and the hinge connecting end on the left side of the lower arm may be hinge-connected to the sub-mounting member such that the left mounting point of the lower arm can be formed in a vertical position which is different from that of the left mounting point of the upper arm.

In this case, the sub-mounting member may be installed toward the main mounting member, which is located on the right side (i.e., at the rear with respect to the longitudinal direction of the vehicle), where the sub-mounting member is not installed such that the mounting point on the left side of the lower arm, whose vertical position is different from that of the mounting point of the upper arm, can be formed between the two main mounting members.

One end of the spring damper may be connected to the vehicle frame in a position diagonally upwardly spaced from the hub assembly, and the other end of the spring damper may be connected to the top of the hub assembly such that the spring damper can provide a restoring force to restore the hub assembly, which has moved upward, to its original position.

As another example, the upper arm and the lower arm may comprise a pair of left and right hinge connecting ends, respectively, for forming the mounting points, the hub assembly may be vertically movably disposed in a position spaced apart from a vehicle frame with the upper arm and the lower arm interposed therebetween, two main mounting members for mounting the upper arm and the lower arm may be installed parallel to each other at regular intervals in the longitudinal direction on the vehicle frame, a sub-mounting member may be installed on left and right sides of the main mounting members, respectively, in positions where the pairs of hinge connecting ends of the upper arm and the lower arm are connected, and among the pairs of hinge connecting ends of the upper arm and the lower, the hinge connecting end, which is located on the left or right side with respect to the hub assembly, of any one of the upper arm and the lower arm may be hinge-connected to any one of the sub-mounting members to form the mounting point.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings. In describing the present invention, well-known functions or constructions will not be described in detail since they may unnecessarily obscure the understanding of the present invention.

Figure 1:
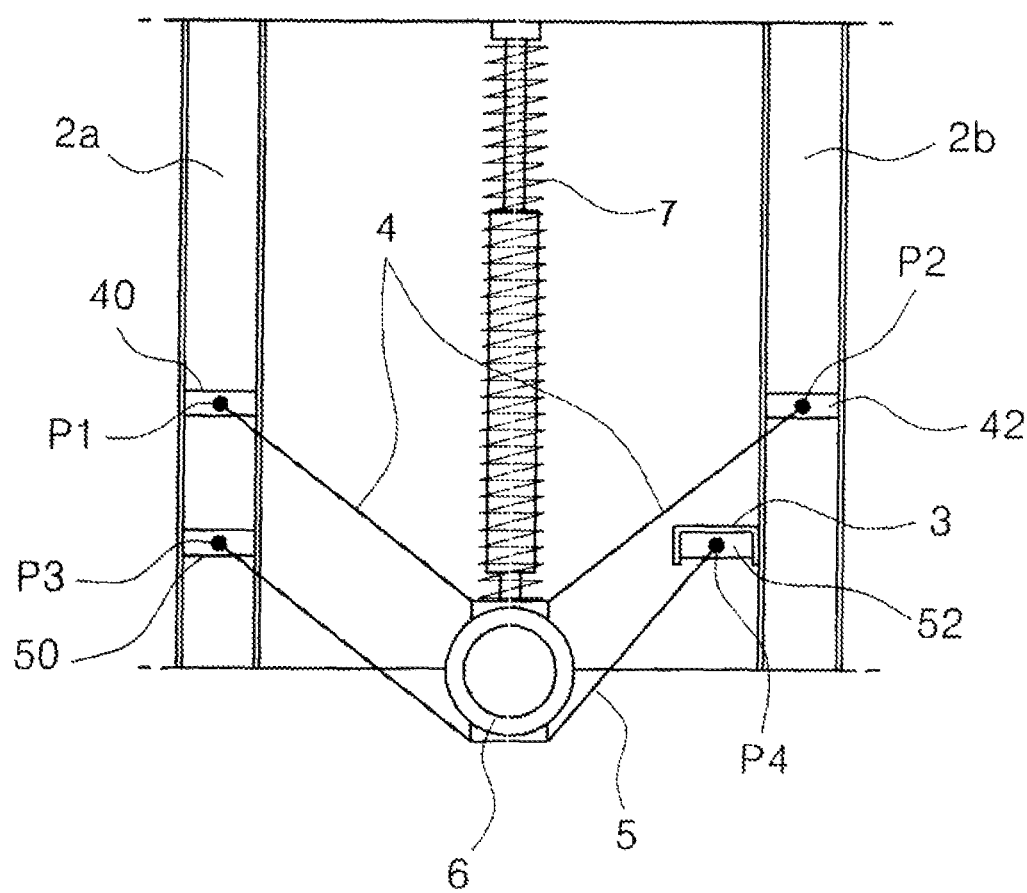
FIG. 1 is a schematic diagram showing a suspension structure for a multi-purpose utility vehicle in accordance with an embodiment of the present invention.

FIG. 1 is a schematic diagram showing a suspension structure for a multi-purpose utility vehicle in accordance with an embodiment of the present invention.

As shown in FIG. 1, a suspension structure for a multi-purpose utility vehicle in accordance with an embodiment of the present invention is a double wishbone type suspension including a spring damper 7 and is characterized in that, among a plurality of mounting points P1, P2, P3, and P4 where an upper arm 4 and a lower arm 5 arranged vertically parallel to each other are connected to a vehicle body, the vertical positions of the mounting points P2 and P4, which are located on the left or right side (located on the right side in FIG. 1) with respect to a hub assembly 6, of the upper arm 4 and the lower arm 5 are different from each other, which will be described in more detail below.

Figure 2:
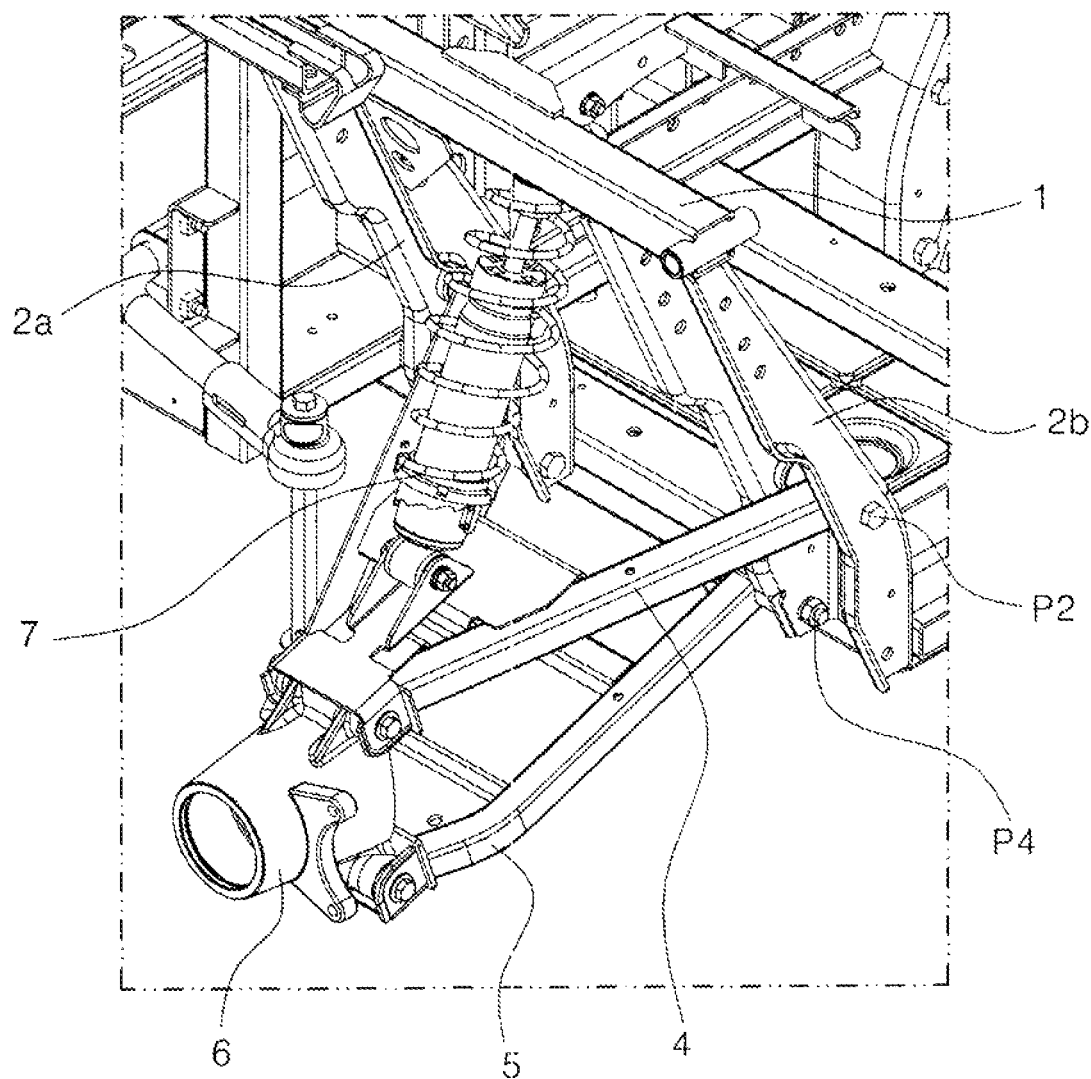
FIG. 2 is a perspective view showing a detailed configuration of the suspension structure for a multi-purpose utility vehicle in accordance with an embodiment of the present invention.
Figure 3:
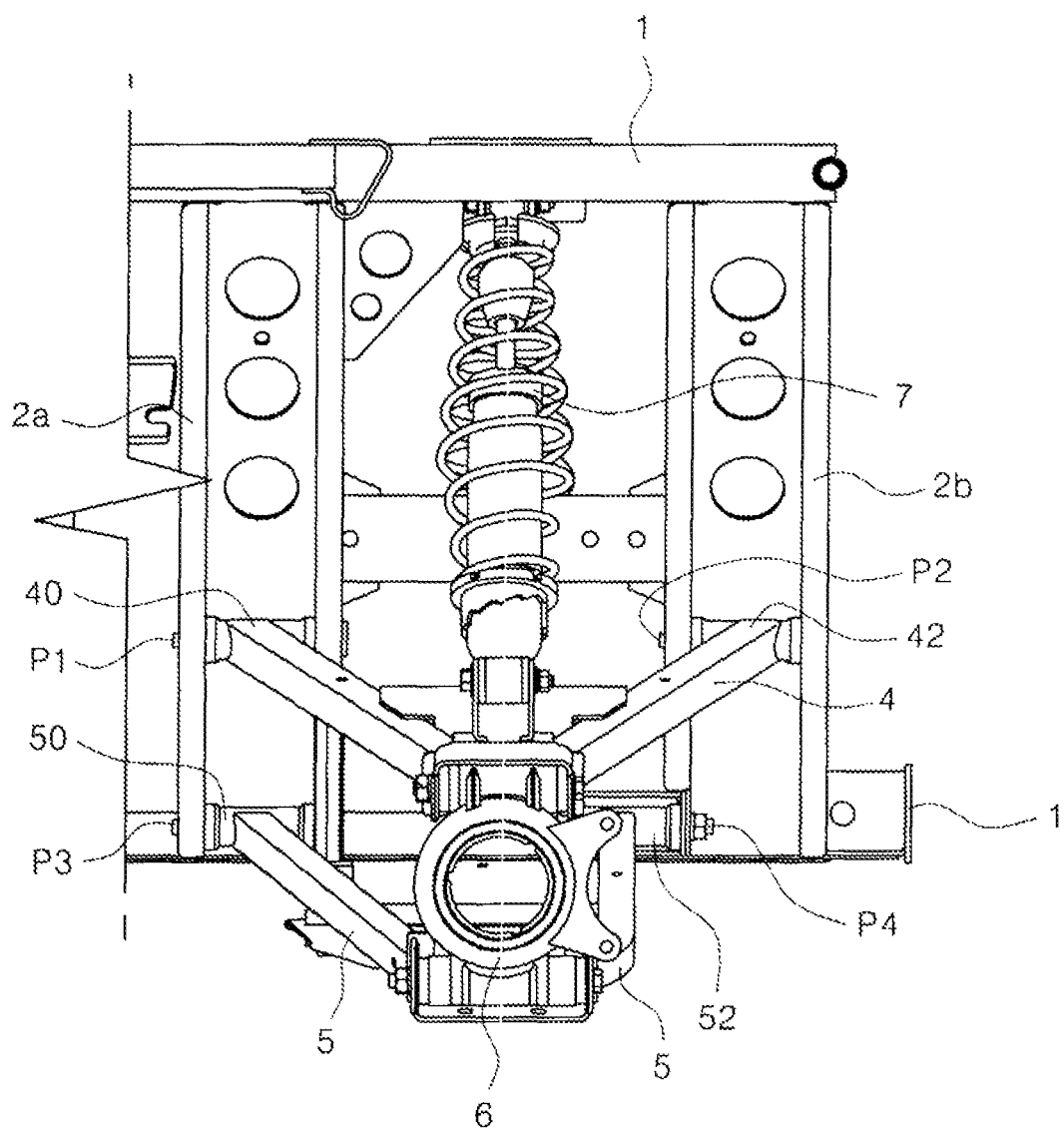
FIG. 3 is a front view of the suspension structure for a multi-purpose utility vehicle in accordance with an embodiment of the present invention shown in FIG. 2.
Figure 4:
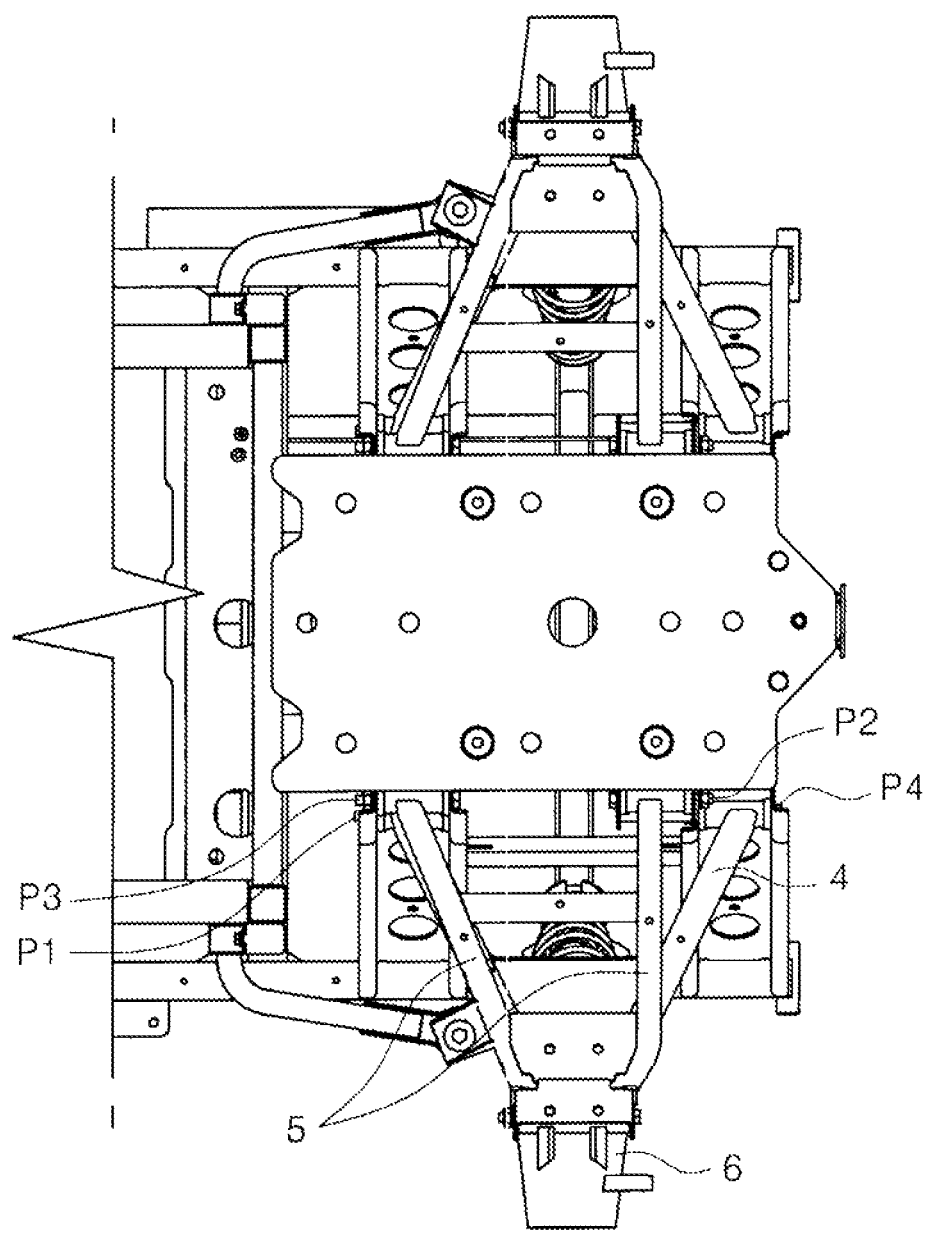
FIG. 4 is a bottom view of the suspension structure for a multi-purpose utility vehicle in accordance with an embodiment of the present invention shown in FIG. 2.

FIG. 2 is a perspective view showing a detailed configuration of the suspension structure for a multi-purpose utility vehicle in accordance with an embodiment of the present invention, FIG. 3 is a front view of the suspension structure for a multi-purpose utility vehicle in accordance with an embodiment of the present invention shown in FIG. 2, and FIG. 4 is a bottom view of the suspension structure for a multi-purpose utility vehicle in accordance with an embodiment of the present invention shown in FIG. 2.

Referring to FIGS. 2 to 4, the upper arm 4 and the lower arm 5 have a wishbone shape and comprise a pair of hinge connecting ends 40/42 and 50/52, respectively, for forming the mounting points. Each pair of hinge connecting ends 40/42 and 50/52 of the upper arm 4 and the lower arm 5 are hinge-connected to mounting members, which will be described later, to form a plurality of (e.g., a total of four) mounting points P1, P2, P3, and P4. Here, the upper arm 4 and the lower arm 5 are substantially horizontal to a road surface and arranged vertically parallel to each other at regular intervals.

The hub assembly 6 is vertically movably disposed in a position spaced apart from a vehicle frame 1 with the upper arm 4 and the lower arm 5 interposed therebetween. The hub assembly 6 includes a bearing on which an axle is rotatably supported. One end of the spring damper 7 is connected to the top of the hub assembly 6, and the other end of the spring damper 7 is supported on the vehicle frame 1 in a position diagonally upwardly spaced from the hub assembly 6.

The spring damper 7 has an elastic structure and provides a restoring force to restore the hub assembly 6, which has moved upward, to its original position. Thus, when the hub assembly 6 moves upward together with the axle due to road impact during running of the vehicle, the spring damper 7 contracts to absorb and attenuate the impact force. Moreover, the axle can be restored to its original position by its restoring force after the impact.

Two main mounting members 2a and 2b are installed parallel to each other at regular intervals on the vehicle frame 1 to mount the upper arm 4 and the lower arm 5. A sub-mounting member 3 is installed on one side of the main mounting member 2b of the two main mounting members 2a and 2b, and among the hinge connecting ends 40/42 and 50/52 of the upper arm 4 and the lower 5, the hinge connecting end 42 or 52, which is located on the right side with respect to the hub assembly 6, of any one of the upper arm 4 and the lower 5 is hinge-connected to the sub-mounting member 3 to form the mounting point.

That is, among the hinge connecting ends 40/42 and 50/52 of the upper arm 4 and the lower 5, the hinge connecting end on the left or right side of any one of the upper arm 4 and the lower 5 is hinge-connected to the sub-mounting member 3, and thus among the four mounting points P1, P2, P3, and P4, the vertical position of the mounting point P1 or P2 of the upper arm 4 and that of the mounting point P3 or P4 of the lower arm 5 on either the left or right side are changed from each other. When the vertical positions of the mounting positions of each arm are changed from each other in the above manner, the geometric configuration of the arm is changed, and thus the steering characteristics are also changed.

In one embodiment of the present invention shown in the figures, the sub-mounting member 3 is installed at a lower end of the main mounting member 2b, which is located on the right side with respect to the hub assembly 6, of the two main mounting members 2a and 2b, and the hinge connecting end 52 on one side of the lower arm 5 is hinge-connected to the sub-mounting member 3. That is, the right mounting point P4 of the lower arm 5 is formed in a vertical position which is different from that of the right mounting point P2 of the upper arm 4.

When the sub-mounting member 3 is installed on the right main mounting member 2b in the above-manner, the sub-mounting member 3 is installed toward the main mounting member 2a, which is located on the left side, where the sub-mounting member 3 is not installed such that the mounting point P4 of one side of the lower arm 5, whose vertical position is different from that of the mounting point P2 of the upper arm 4, may be formed between the two main mounting members 2a and 2b.

Figure 5:
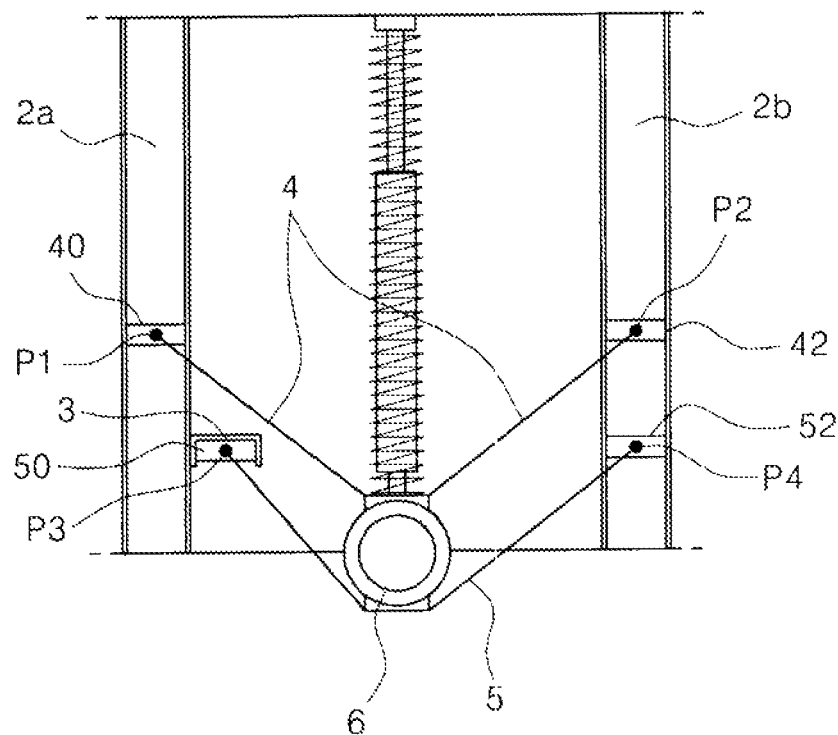
FIGS. 5 to 11 are schematic diagrams showing various modified examples of the suspension structure for a multi-purpose utility vehicle in accordance with an embodiment of the present invention.
Figure 6:
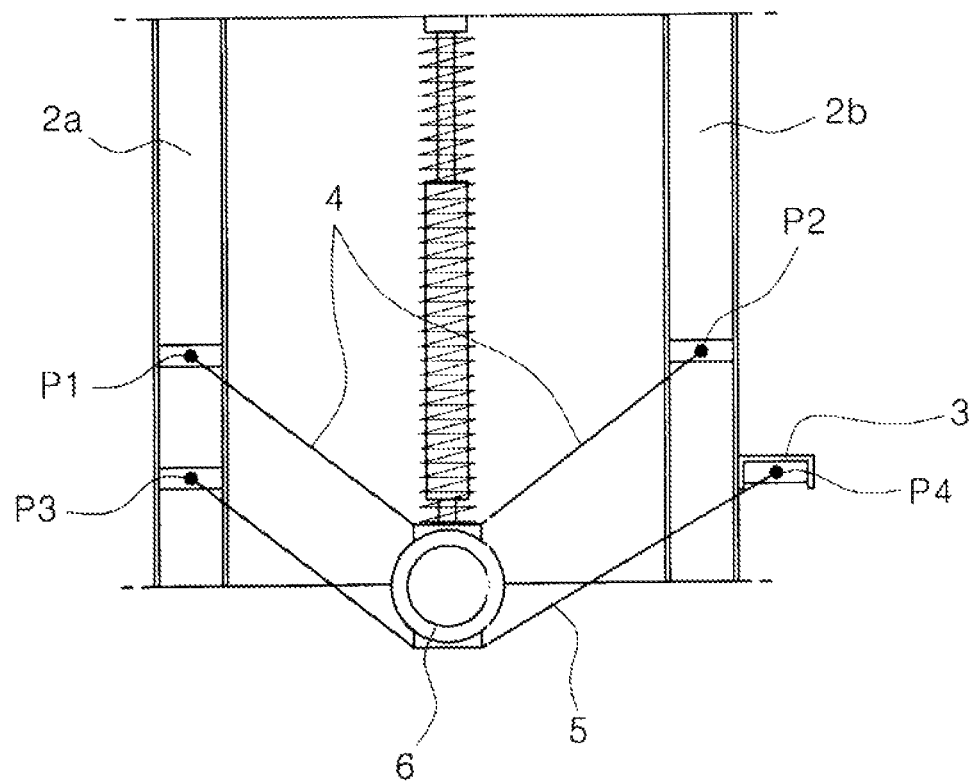
Figure 7:
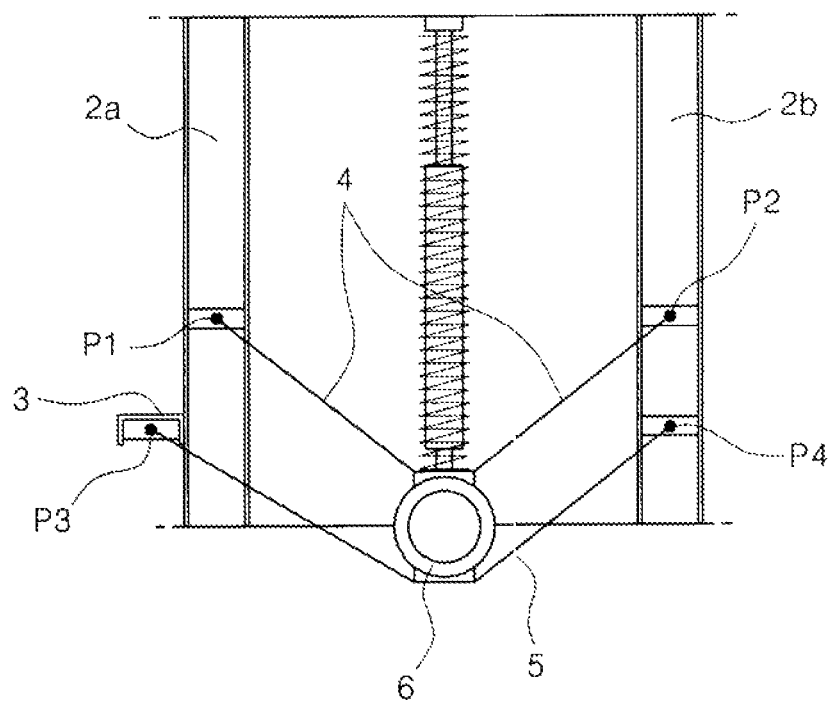
Figure 8:
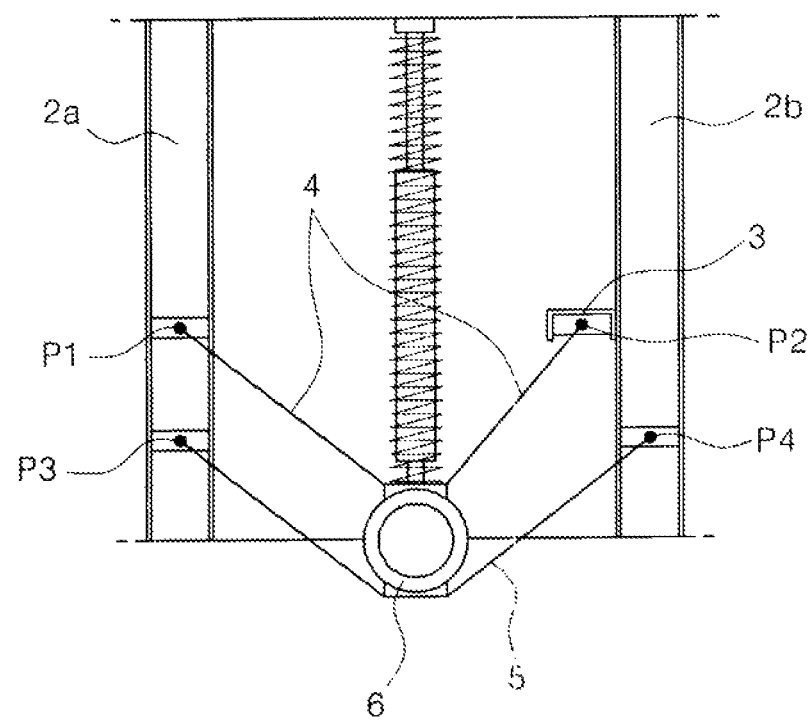
Figure 9:
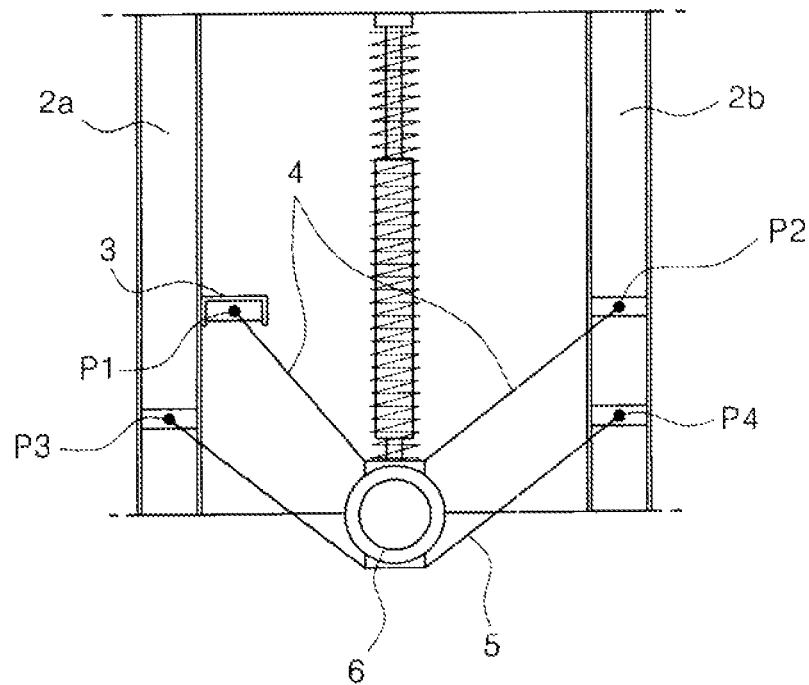
Figure 10:
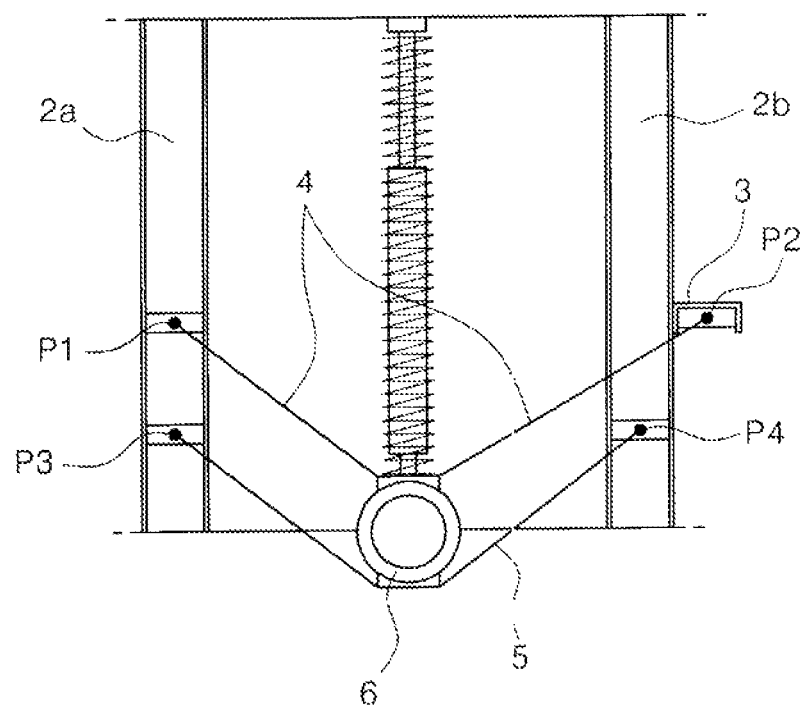
Figure 11:
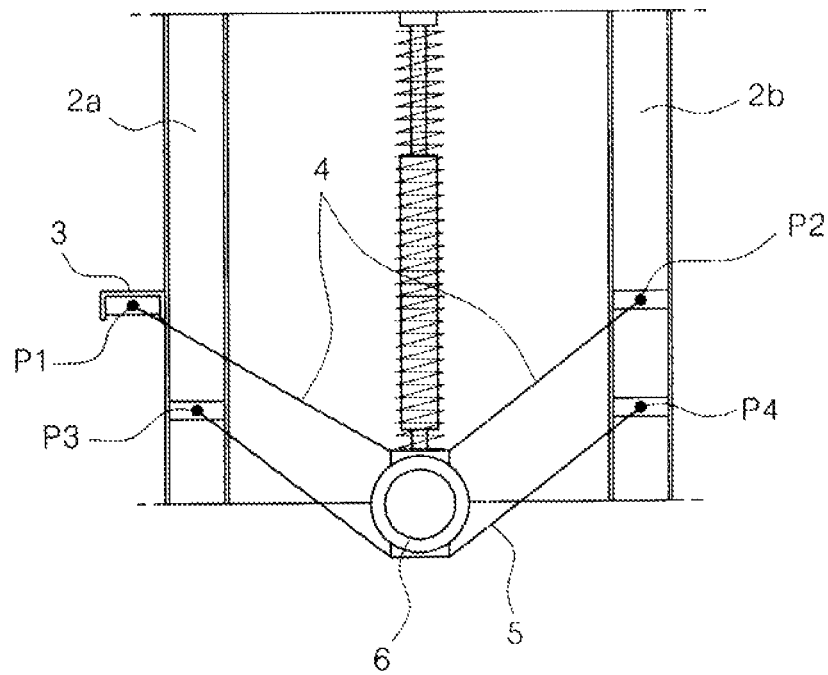

FIG. 5 is a schematic diagram showing a modified example of the suspension structure for a multi-purpose utility vehicle in accordance with an embodiment of the present invention.

According to the modified example of the suspension structure, the sub-mounting member 3 is installed at a lower end of the main mounting member 2a, which is located on the left side with respect to the hub assembly 6, of the two main mounting members 2a and 2b, and the hinge connecting end 50 of one side (left side) of the lower arm 5 is hinge-connected to the sub-mounting member 3. That is, the left mounting point P3 of the lower arm 5 is formed in a vertical position which is different from that of the left mounting point P1 of the upper arm 4.

In the same manner as in this modified example, when the sub-mounting member 3 is installed on the left main mounting member 2a, the sub-mounting member 3 is installed toward the main mounting member 2b, which is located on the right side, where the sub-mounting member 3 is not installed such that the mounting point P3 of one side of the lower arm 5, whose vertical position is different from that of the mounting point P1 of the upper arm 4, may be formed between the two main mounting members 2a and 2b.

Meanwhile, as shown in FIGS. 6 to 11 schematically showing various modified examples besides the previously described structure, the sub-mounting member 3 is installed toward the outside of the main mounting member 2a or 2b in a position where the lower arm 5 is to be installed or installed toward the inside or outside of the mounting member 2a or 2b in a position where the upper arm 4 is to be installed such that the vertical positions of the mounting points of the lower arm 5 and those of the mounting points of the upper arm 4 may be different from each other, thus providing various structures.

Figure 12:
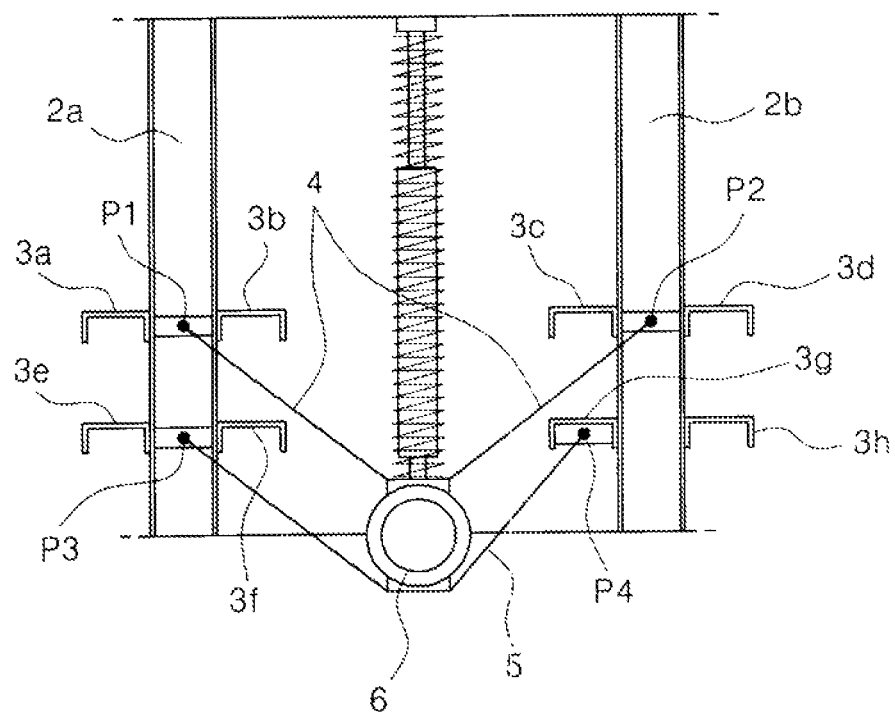
FIG. 12 is a schematic diagram showing a suspension structure for a multi-purpose utility vehicle in accordance with another embodiment of the present invention.

FIG. 12 is a schematic diagram showing a suspension structure for a multi-purpose utility vehicle in accordance with another embodiment of the present invention. Referring to FIG. 12, sub-mounting members 3a to 3h are installed on the left and right sides of main mounting members 2a and 2b in positions where a pair of hinge connecting ends of an upper arm 4 and a lower arm 5 are connected such that a mounting point may be selectively formed on any one of the sub-mounting members, thus providing a structure with various changes in steering characteristics during assembly of the suspension.

As described above, according to the suspension structure for a multi-purpose utility vehicle in accordance with the embodiments of the present invention, it is possible to change the installation position of the arms, which constitute the double wishbone suspension, in various manners only by changing the position of the sub-mounting member with respect to the main mounting members without significantly changing the vehicle frame structure, thus controlling steering characteristics according to driving conditions of the vehicle without a significant change in layout.

The foregoing detailed description of the present invention has been described with respect to particular embodiments. However, it should be understood that the present invention is not limited to such particular embodiments set forth in the detailed description, but that the present invention includes all modifications, equivalents, and alternatives which fall within the spirit and scope of the present invention defined by the appended claims.

What is claimed is:

1. A suspension structure for a multi-purpose utility vehicle, the suspension structure comprising a double wishbone type suspension comprising a spring damper, characterized in that, among a plurality of mounting points where an upper arm and a lower arm arranged vertically parallel to each other are connected to a vehicle body, vertical positions of the mounting points, which are located on the left or right side with respect to a hub assembly rotatably supporting an axle, of the upper arm and the lower arm are different from each other in regard to vertical direction of each mounting point, wherein the upper arm and the lower arm comprise a pair of left and right hinge connecting ends, respectively, for forming the mounting points, the hub assembly is vertically movably disposed in a position spaced apart from a vehicle frame with the upper arm and the lower arm interposed therebetween, two main mounting members for mounting the upper arm and the lower arm are installed parallel to each other at regular intervals in the longitudinal direction on the vehicle frame, a sub-mounting member is installed on one side of any one of the two main mounting members, and among the pairs of hinge connecting ends of the upper arm and the lower, the hinge connecting end, which is located on the left or right side assembly, of any one of the upper arm and the lower arm is hinge-connected to the sub-mounting member to form the mounting point such that the vertical positions of the mounting points on cue aide of the upper arm and the lower arm are different from each other.

2. The suspension structure of claim 1, wherein the sub-mounting member is installed at a lower end of the main mounting member, which is located on the right side with respect to the hub assembly (i.e., at the rear with respect to the longitudinal direction of the vehicle), of the two main mounting members, and the hinge connecting end on the right side of the lower arm is hinge-connected to the sub-mounting member such that the right mounting point of the lower arm is formed in a vertical position which is different from that of the right mounting point of the upper arm.

3. The suspension structure of claim 2, wherein the sub-mounting member is installed toward the main mounting member, which is located on the left side (i.e., at the front with respect to the longitudinal direction of the vehicle), where the sub-mounting member is not installed such that the mounting point on the right side of the lower arm, whose vertical position is different from that of the mounting point of the upper arm, is formed between the two main mounting members.

4. The suspension structure of claim 1, wherein the sub-mounting member is installed at a lower end of the main mourning member, which is located on the left side with respect to the hub assembly (i.e., at the front with respect to the longitudinal direction of the vehicle), of the two main mounting members, and the hinge connecting end on the left side of the lower arm is hinge-connected to the sub-mounting member such that the left mounting point of the lower arm is formed in a vertical position which is different from that of the left mounting point of the upper arm.

5. The suspension structure of claim 4, wherein the sub-mounting member is installed toward the main mounting member, which is located on the right side (i.e., at the rear with respect to the longitudinal direction of the vehicle), where the sub-mounting member is not installed such that the mounting point on the left side of the lower arm, whose vertical position is different from that of the mounting point of the upper arm, is formed between the two main mounting members.

6. The suspension structure of claim 1, wherein one end of the spring damper is connected to the vehicle frame in a position diagonally upwardly spaced from the hub assembly, and the other end of the spring damper is connected to the top of the hub assembly such that the spring damper provides a restoring force to restore the hub assembly, which has moved upward, to its original position.

7. A suspension structure for a multi-purpose utility vehicle, the suspension structure comprising a double wishbone type suspension comprising a spring damper, characterized in that, among a plurality of mounting points where an upper arm and a lower arm arranged vertically parallel to each other are connected to a vehicle body, vertical positions of the mounting points, which are located on the left or right side with respect to a hub assembly rotatably supporting an axle, of the upper arm and the lower arm are different from each other in regard to vertical direction of each mounting point, wherein the upper arm and the lower arm comprise a pair of left and right hinge connecting ends, respectively, for forming the mounting points, the huh assembly is vertically movably disposed in a position spaced apart from a vehicle frame with the upper arm and the lower arm interposed therebetween, two main mounting members for mounting the upper arm and the lower arm are installed parallel to each other at regular intervals in the longitudinal direction on the vehicle frame, a sub-mounting member is installed on left and right sides of the main mounting members, respectively, in positions where the pairs of hinge connecting ends of the upper arm and the lower arm are connected, and among the pairs of hinge connecting ends of the upper arm and the lower, the hinge connecting end, which is located on the left or right side with respect to the hub assembly, of any one of the upper arm and the lower arm is hinge-connected to any One of the sub-mounting members to form the mounting point.

* * * * *